United States Patent
Cazzoli

(10) Patent No.: US 10,748,426 B2
(45) Date of Patent: Aug. 18, 2020

(54) SYSTEMS AND METHODS FOR DETECTION AND PRESENTATION OF OCCLUDED OBJECTS

(71) Applicant: Toyota Research Institute, Inc., Los Altos, CA (US)

(72) Inventor: James Cazzoli, Mahopac, NY (US)

(73) Assignee: Toyota Research Institute, Inc., Los Altos, CA (US)

( * ) Notice: Subject to any disclaimer, the term of this patent is extended or adjusted under 35 U.S.C. 154(b) by 156 days.

(21) Appl. No.: 15/787,156

(22) Filed: Oct. 18, 2017

(65) Prior Publication Data

US 2019/0114921 A1  Apr. 18, 2019

(51) Int. Cl.
| | | |
|---|---|---|
| *G08G 1/16* | (2006.01) | |
| *G05D 1/02* | (2020.01) | |
| *H04W 4/029* | (2018.01) | |
| *H04W 4/40* | (2018.01) | |
| *H04W 4/02* | (2018.01) | |
| *G01S 17/931* | (2020.01) | |
| *H04W 4/38* | (2018.01) | |

(52) U.S. Cl.
CPC .......... *G08G 1/166* (2013.01); *G01S 17/931* (2020.01); *G05D 1/0289* (2013.01); *H04W 4/023* (2013.01); *H04W 4/029* (2018.02); *H04W 4/40* (2018.02); *H04W 4/38* (2018.02)

(58) Field of Classification Search
None
See application file for complete search history.

(56) References Cited

U.S. PATENT DOCUMENTS

| | | |
|---|---|---|
| 6,974,414 B2 | 12/2005 | Victor |
| 7,620,497 B2 | 11/2009 | Maass |
| 7,982,620 B2 * | 7/2011 | Prokhorov ........... B60K 28/066 340/576 |
| 8,390,440 B2 | 3/2013 | Krautter et al. |
| 8,482,486 B2 | 7/2013 | Seder et al. |
| 9,047,703 B2 | 6/2015 | Beckwith et al. |
| 9,251,715 B2 | 2/2016 | Hing et al. |
| 9,428,183 B2 | 8/2016 | Foley |
| 2009/0140881 A1 * | 6/2009 | Sakai ....................... B60R 1/00 340/901 |

(Continued)

*Primary Examiner* — Dale W Hilgendorf
*Assistant Examiner* — Alexander C. Bost
(74) *Attorney, Agent, or Firm* — Christopher G. Darrow; Darrow Mustafa PC

(57) ABSTRACT

System, methods, and other embodiments described herein relate to acquiring remote sensor data and identifying occluded objects from the remote sensor data. In one embodiment, a method includes acquiring, within a vehicle from one or more remote sensors, remote sensor data that indicates information about a nearby environment of the vehicle. The method includes identifying an occluded object in the surrounding environment according to the remote sensor data, and local sensor data generated by the vehicle. The occluded object is obscured from being perceived by one or more vehicle sensors of the vehicle. The local sensor data indicates information about at least nearby objects that have been observed by the vehicle sensors. The method includes rendering, within the display of the vehicle, a visualization of the occluded object to provide a view of the occluded object when the occluded object is otherwise obscured from being perceived by the vehicle.

17 Claims, 6 Drawing Sheets

(56) References Cited

U.S. PATENT DOCUMENTS

| | | | |
|---|---|---|---|
| 2010/0157430 A1* | 6/2010 | Hotta | G02B 27/01 |
| | | | 359/630 |
| 2010/0253594 A1 | 10/2010 | Szczerba et al. | |
| 2012/0173067 A1 | 7/2012 | Szczerba et al. | |
| 2012/0173069 A1 | 7/2012 | Tsimhoni et al. | |
| 2015/0046022 A1* | 2/2015 | Bai | G07C 5/008 |
| | | | 701/31.5 |
| 2015/0109444 A1* | 4/2015 | Zhang | B60Q 9/008 |
| | | | 348/148 |
| 2015/0316765 A1 | 11/2015 | Kim et al. | |
| 2015/0360698 A1 | 12/2015 | Beyene et al. | |
| 2017/0076599 A1* | 3/2017 | Gupta | B60Q 9/00 |
| 2017/0371346 A1* | 12/2017 | Mei | G01S 17/931 |
| 2019/0168610 A1* | 6/2019 | Nakane | G06K 9/00791 |
| 2019/0193728 A1* | 6/2019 | Tanaka | B60R 21/00 |
| 2019/0244515 A1* | 8/2019 | Hacker | G08G 1/164 |

* cited by examiner

SYSTEMS AND METHODS FOR DETECTION AND PRESENTATION OF OCCLUDED OBJECTS

TECHNICAL FIELD

The subject matter described herein relates in general to systems for presenting information within a vehicle and, more particularly, to providing visual indicators about occluded objects within an external environment.

BACKGROUND

Locating objects in an environment using electronic means such as light detection and ranging (LIDAR) sensors, cameras, radar or other sensors can be a complex task. For example, the sensors may not perceive aspects of the surroundings that are beyond a particular distance (e.g., sensing range of the sensors). Moreover, a field-of-view of the noted sensors can be obstructed by objects within the surrounding environment such as buildings, trees, and other vehicles causing the sensors to potentially fail to detect occluded objects in the obstructed areas.

Moreover, when the scanning vehicle is operating in an autonomous mode, the vehicle uses the sensors to build a map of the surrounding environment including various features (e.g., objects, terrain, etc.) that facilitates avoiding objects within the surrounding environment, navigating, and so on. However, because some objects may be undetected due to the obstructed areas or because of other factors, the map may not provide a complete representation of the surrounding environment. As a result, the vehicle may encounter unforeseen obstacles causing erratic maneuvers or other undesirable effects.

SUMMARY

Example systems and methods are disclosed herein that relate to a manner of occluded object detection and presentation. For example, in one aspect, sensors of other vehicles and devices (e.g., mobile phones, infrastructure sensors, etc.) within a surrounding environment are leveraged to acquire information about objects that cannot be directly perceived by a vehicle. Accordingly, a vision system within a vehicle, in one embodiment, acquires remote sensor data as the vehicle progresses through an area. In general, the vision system communicates with different remote sensors integrated within the noted devices to obtain remote sensor data. This remote sensor data includes information about a nearby environment (e.g., the surrounding environment and beyond) of the vehicle that spans beyond a range of the vehicle sensors of the vehicle and also from perspectives beyond those perceivable by the vehicle sensors. Consequently, the remote sensor data includes information about remote objects that may not be perceived by the vehicle.

Therefore, in one embodiment, the vision system analyzes the remote sensor data in relation to a perceived construction of the surrounding environment to identify whether the remote objects embodied in the remote sensor data are obscured from perception by the vehicle. When the vision system determines one or more of the remote objects are obscured, then the vision system identifies/labels the obscured remote objects as occluded objects and proceeds to present the occluded objects to a driver or other occupants of the vehicle. In general, the vision system uses information acquired about the occluded object to determine how the occluded object will be rendered within a display of the vehicle. For example, a particular object class (e.g., vehicle, pedestrian, etc.) can be used to provide a shape of the occluded object. In further aspects, the vision system uses a representation of the occluded object from the remote sensor data (e.g., point cloud or image data). In either case, the vision system renders a graphic representing the occluded object on a display within the vehicle to indicate a location of the occluded object to occupants of the vehicle. The display can be an augmented reality display integrated within windows of the vehicle, a console display, or another suitable manner of providing a visual indication to the driver/occupants.

Moreover, in further aspects, the location of the occluded object is provided to an autonomous driving module so that the vehicle can account for a location and/or trajectory of the occluded object when performing path planning and obstacle avoidance. In this way, the vision system improves situational awareness for occupants and an ability of autonomous/semi-autonomous functionality of the vehicle to plan for objects in the surrounding environment.

In one embodiment, a vision system for depicting occluded objects on a display within a vehicle is disclosed. The vision system includes one or more processors and a memory that is communicably coupled to the one or more processors. The memory stores a monitoring module including instructions that when executed by the one or more processors cause the one or more processors to acquire, within the vehicle from one or more remote sensors, remote sensor data that indicates information about a nearby environment of the vehicle. The monitoring module includes instructions to identify an occluded object in the surrounding environment according to the remote sensor data, and local sensor data generated by the vehicle. The occluded object is obscured from being perceived by one or more vehicle sensors of the vehicle. The local sensor data indicates information about at least observed objects that have been observed by the one or more vehicle sensors. The memory stores a display module including instructions that when executed by the one or more processors cause the one or more processors to render, within the display, a visualization of the occluded object to provide a view of the occluded object when the occluded object is otherwise obscured from being perceived by the vehicle.

In one embodiment, a non-transitory computer-readable medium for improving awareness of occluded objects within a vehicle is disclosed. The non-transitory computer-readable medium stores instructions that when executed by one or more processors cause the one or more processors to perform the disclosed functions. The instructions include instructions to acquire, within the vehicle from one or more remote sensors, remote sensor data that indicates information about a nearby environment of the vehicle. The instructions include instructions to identify an occluded object in the surrounding environment according to the remote sensor data, and local sensor data generated by the vehicle. The occluded object is obscured from being perceived by one or more vehicle sensors of the vehicle. The local sensor data indicates information about at least observed objects that have been observed by the one or more vehicle sensors. The instructions include instructions to render, within a display of the vehicle, a visualization of the occluded object to provide a view of the occluded object when the occluded object is otherwise obscured from being perceived by the vehicle In one embodiment, a method of depicting occluded objects on a display within a vehicle is disclosed. The method includes acquiring, within a vehicle from one or more remote sensors, remote sensor data that indicates information about a nearby environment of the vehicle. The method includes identifying an occluded object in the surrounding environment according to the remote sensor data, and local sensor data generated by the vehicle. The occluded object is obscured from being perceived by one or more vehicle sensors of the vehicle. The local sensor data indicates information about at least nearby objects that have been observed by the vehicle sensors. The method includes rendering, within the display of the vehicle, a visualization of the occluded object to provide a view of the occluded object when the occluded object is otherwise obscured from being perceived by the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
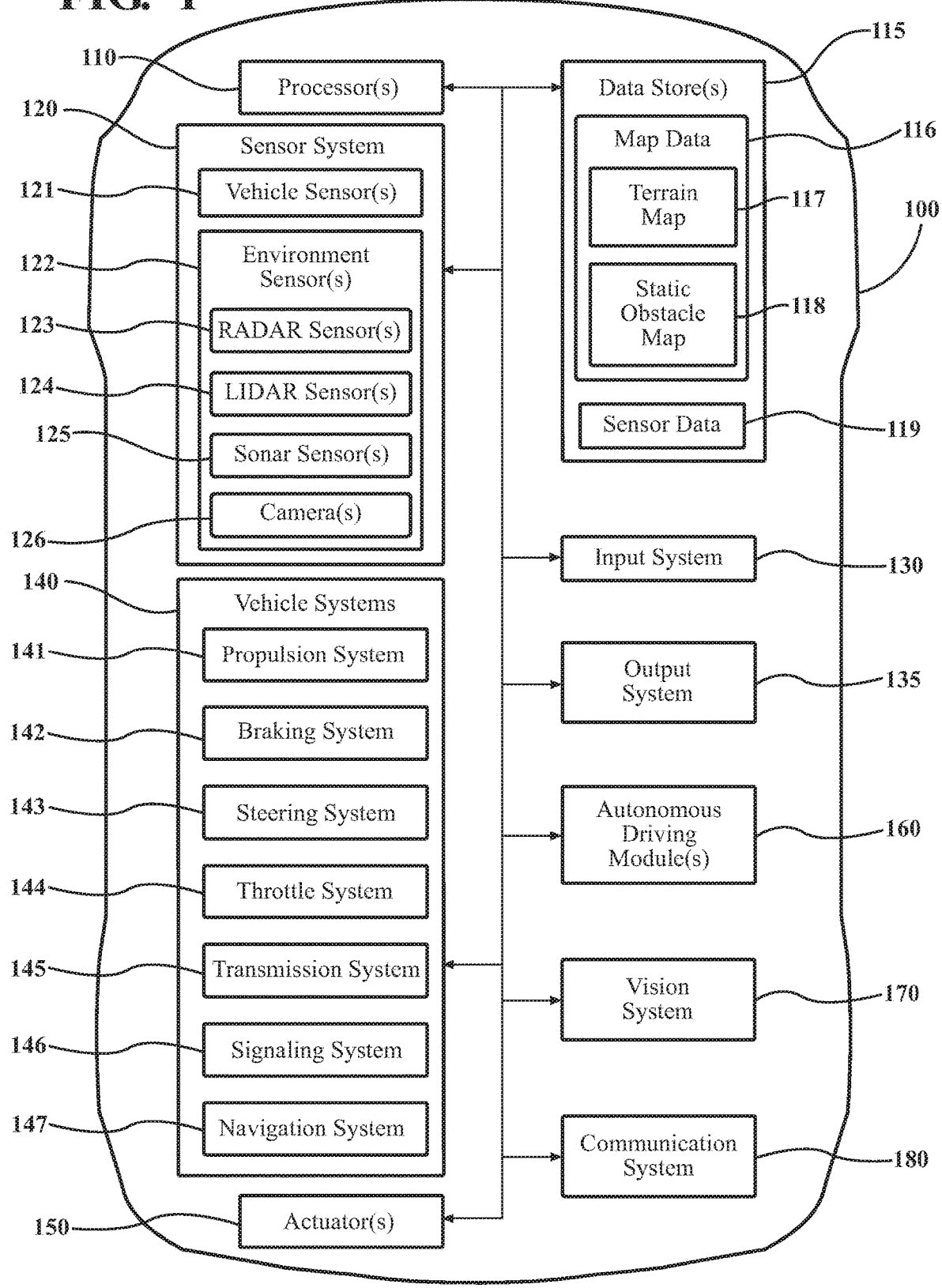
FIG. 1 illustrates one embodiment of a vehicle within which systems and methods disclosed herein may be implemented.

Systems, methods and other embodiments associated with detecting occluded objects to improve awareness about a surrounding environment are disclosed herein. As mentioned previously, because of capabilities of various sensors in a vehicle and locations of objects within a surrounding environment of the vehicle, in various circumstances, the sensors may perceive some objects while other objects may be occluded. For example, when an object is behind a building, around a corner, behind a truck or other vehicle, beyond a visible range of a sensor, or another circumstance for which the vehicle sensors do not perceive an object, the vehicle is left with potentially incomplete knowledge of the surrounding environment since some objects are then occluded from the vehicle's perception.

Therefore, in one embodiment, a vision system is integrated with a vehicle in order to acquire remote sensor data from secondary sources outside of the vehicle. Thus, the vision system can supplement local sensor data acquired by the vehicle sensors with the remote sensor data to improve knowledge about the surrounding environment and thereby improve path planning, obstacle avoidance, and/or situational awareness of the driver/occupants. For example, in one aspect, remote sensors of other vehicles and devices (e.g., mobile phones, infrastructure sensors, etc.) within the surrounding environment are leveraged to acquire information about objects that cannot be directly perceived by the vehicle. In one embodiment, the vision system communicates with the remote sensors by directly querying the remote sensors and/or by querying a collection point (e.g., central server) to obtain the remote sensor data.

The remote sensor data includes information about a nearby environment of the vehicle that spans beyond a range of the vehicle sensors and also from perspectives beyond those perceivable by the vehicle sensors. Consequently, the remote sensor data includes information about remote objects that may not be perceived by the vehicle. Therefore, in one embodiment, the vision system analyzes the remote sensor data in relation to a mapping or other perceived reconstruction of the surrounding environment to identify whether the remote objects embodied in the remote sensor data are obscured from perception by the vehicle.

When the vision system identifies that at least one of the remote objects are obscured, then the vision system proceeds to present the occluded objects to a driver or other occupants of the vehicle. In general, the vision system uses information acquired about the occluded object to determine how the occluded object will be rendered. For example, a particular object class (e.g., vehicle, pedestrian, etc.) can be used to provide a shape of the occluded object. In further aspects, the vision system uses a representation of the occluded object from the remote sensor data (e.g., point cloud or image data). In either case, the vision system renders a graphic representing the occluded object on a display within the vehicle to indicate a location of the occluded object to occupants of the vehicle.

While the vision system is generally discussed from the perspective of displaying the occluded object, the vision system can alternatively or additionally provide information about the occluded object to an autonomous driving module or other vehicle system so that the vehicle can account for a location and/or trajectory of the occluded object when performing path planning and other functions. In this way, the vision system improves situational awareness for occupants and an ability of autonomous/semi-autonomous functionality of the vehicle to plan for objects that may be encountered in the surrounding environment.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, benefits from the systems and methods as discussed herein.

The vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a vision system 170 that is implemented to perform methods and other functions as disclosed herein relating to detecting occluded objects through querying and/or otherwise communicating with secondary sources of information in order to improve mapping and knowledge of a surrounding environment of the vehicle 100. The noted functions and methods will become more apparent with a further discussion of the figures.

Moreover, the vehicle 100 is illustrated as including a communication system 180. In one embodiment, the communication system 180 includes a transceiver for communicating wirelessly using one or more communication frequencies and/or according to one or more communication protocols. For example, in various implementations, the communication system 180 communicates according to one or more of the following protocols: vehicle-to-vehicle (V2V), vehicle-to-infrastructure (V2I), cellular (3G, 4G, 5G, etc.), IEEE 802.11, IEEE 802.16, IEEE 802.15, and/or another suitable communication format. Additionally, in further aspects, the communication system 180 implements a combination of communications protocols in order to provide for communicating with different types of devices. In either case, the vision system 170 controls or otherwise electronically communicates with the communication system 180 to send and receive communications for acquiring information from remote devices as will be discussed in further detail along with the subsequent figures.

Figure 2:
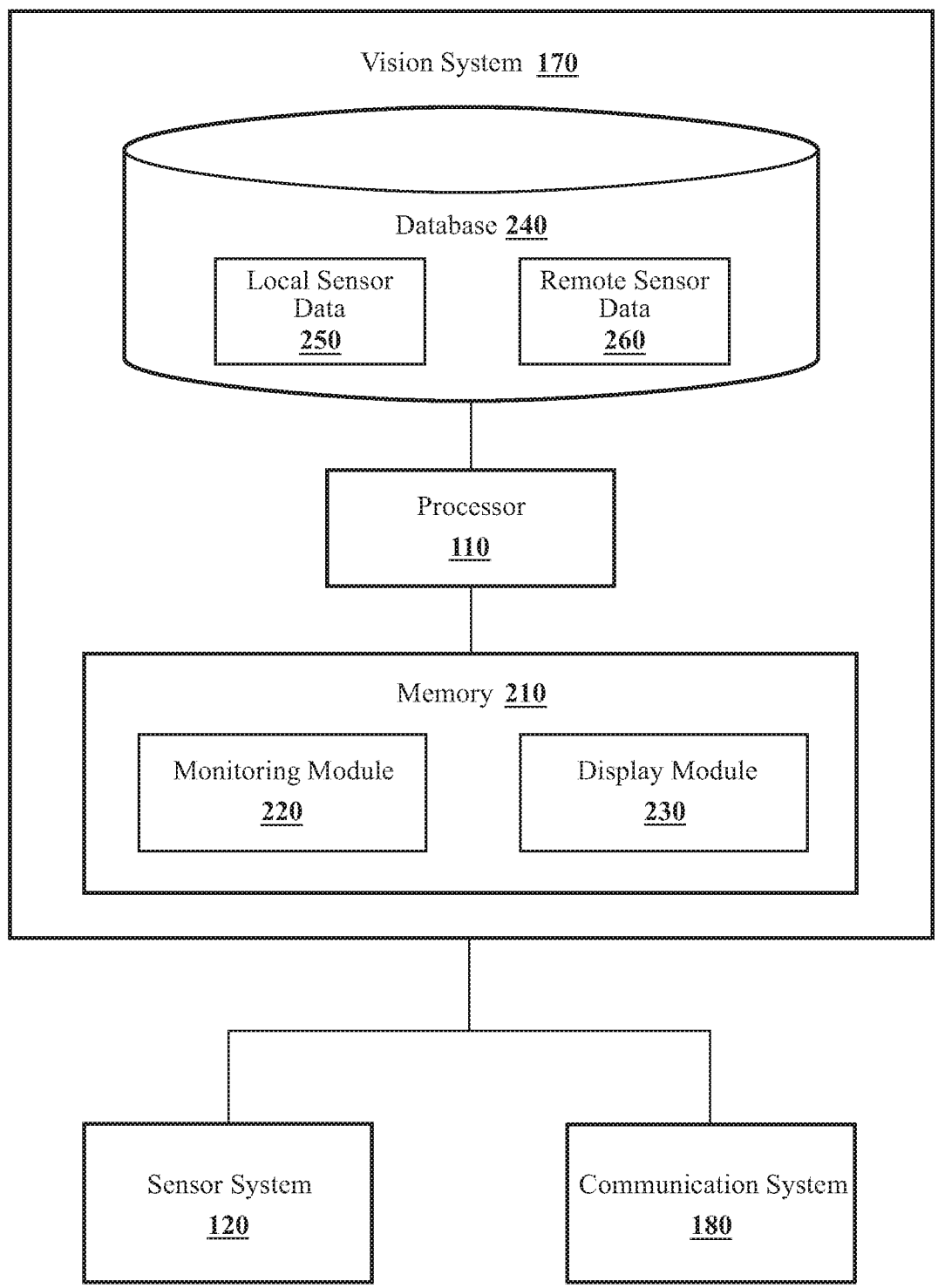
FIG. 2 illustrates one embodiment of a vision system that is associated with improving awareness of an environment by detecting and providing information regarding occluded objects.

With reference to FIG. 2, one embodiment of the vision system 170 of FIG. 1 is further illustrated. The vision system 170 is shown as including a processor 110 from the vehicle 100 of FIG. 1. Accordingly, the processor 110 may be a part of the vision system 170, the vision system 170 may include a separate processor from the processor 110 of the vehicle 100 or the vision system 170 may access the processor 110 through a data bus or another communication path. In either case, the processor 110 is illustrated as part of the vision system 170 for purposes of explanation. Additionally, in one embodiment, the vision system 170 includes a memory 210 that stores a monitoring module 220 and a display module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, in one embodiment, the monitoring module 220 generally includes instructions that function to control the processor 110 to acquire local sensor data 250 from, for example, one or more vehicle sensors of the sensor system 120. In one embodiment, the local sensor data 250 includes data collected from a GPS of a navigation system 147, a camera 126, a sonar 125, a LIDAR 124, a radar 123, and/or another sensor integrated with the vehicle 100. In further aspects, the monitoring module 220 controls multiple iterations of the noted sensors that are embedded with the vehicle 100. Thus, in one embodiment, the local sensor data 250 includes 3D point cloud data, radar detection data, images, and so on from multiple perspectives originating at the vehicle 100.

In either case, the monitoring module 220 collects information that makes up the local sensor data 250. Various systems of the vehicle 100 use the local sensor data 250 for different purposes. For example, the autonomous driving module 160 and/or other components may use the local sensor data 250 for simultaneous localization and mapping (SLAM), for object detection, path planning, and so on. In general, the vision system 170 and/or another component uses the local sensor data 250 to generate a mapping of a surrounding environment of the vehicle 100. The mapping can include locations of objects, terrain, and other aspects of the surrounding environment perceived by the vehicle sensors that is useful in navigating and generally discriminating between aspects of the surrounding environment.

It should be noted that within this disclosure the phrases surrounding environment and nearby environment are used separately. Accordingly, as used herein the phrase surrounding environment generally refers to an area proximate to the vehicle 100 that is within a range or region which is perceivable by the vehicle sensors. By contrast, the phrase nearby environment is intended to encompass an area that is inclusive of the surrounding environment and also extends beyond a perceivable range of the vehicle 100 in both distance and perspective.

Thus, as previously mentioned, the monitoring module 220 also acquires remote sensor data 260 as, for example, a supplement to the local sensor data 250. In other words, the remote sensor data 260 generally encompasses information that further informs the vision system 170 about aspects of the nearby environment.

As a further matter prior to discussing additional aspects of detecting occluded objects, in one embodiment, the vision system 170 includes a database 240. The database 240 is, for example, an electronic data structure stored in the memory 210 or another electronic data store and that is configured with routines that can be executed by the processor 110 for analyzing stored data, providing stored data, organizing stored data, and so on. Thus, in one embodiment, the database 240 stores data used/provided by the modules 220 and 230 in executing various functions. In one embodiment, the database 240 includes the local sensor data 250 and the remote sensor data 260. Additionally, while the local sensor data 250 and the remote sensor data 260 are illustrated as being stored within the database 240, it should be understood that in various embodiments the local sensor data 250 and/or the remote sensor data 260 can be stored in the memory 210, integrated within one or more data structures of the monitoring module 220 and/or the display module 230, and so on.

Accordingly, in one embodiment, the monitoring module 220 controls the communication system 180 to transmit and receive communications to obtain the remote sensor data 260 from devices that are separate and distinct from the vehicle 100. The various devices from which the monitoring module 220 obtains the remote sensor data 260 can include other vehicles that include one or more sensors, infrastructure sensors (e.g., cameras, road sensors, etc.), mobile phones, and/or generally any device that includes a sensor for perceiving aspects of the nearby environment and that can communicate the remote sensor data 260 to the vehicle 100. Additional aspects relating to the form of communications between the remote devices and the vehicle 100 will be discussed along with FIG. 3. However, it should be appreciated that the monitoring module 220 via the communication system 180 can communicate with the remote devices either directly via direct communications or indirectly through a centralized server to acquire the remote sensor data 260.

The remote sensor data 260 itself generally includes at least location information about remote objects so that the vision system 170 can localize the remote objects identified by the remote sensor data 260 within the nearby environment relative to the vehicle 100. Moreover, in further aspects, the remote sensor data 260 also includes trajectory information (e.g., direction and speed), shape and size information of the object, and so on.

In either case, the monitoring module 220 generally includes computer-executable instructions to identify whether the remote sensor data 260 includes information about objects that are occluded from the perspective of the vehicle 100. That is, because a perspective and present location of the vehicle 100 may obscure the vehicle sensors 120 from perceiving certain objects due to buildings, vehicles, and other objects obscuring those occluded objects or form the occluded objects being beyond the range of the vehicle sensors 120, the monitoring module 220 analyzes the remote sensor data 260 to identify the occluded objects and thus improve situational awareness of vehicle systems and/or the driver.

Figure 3:
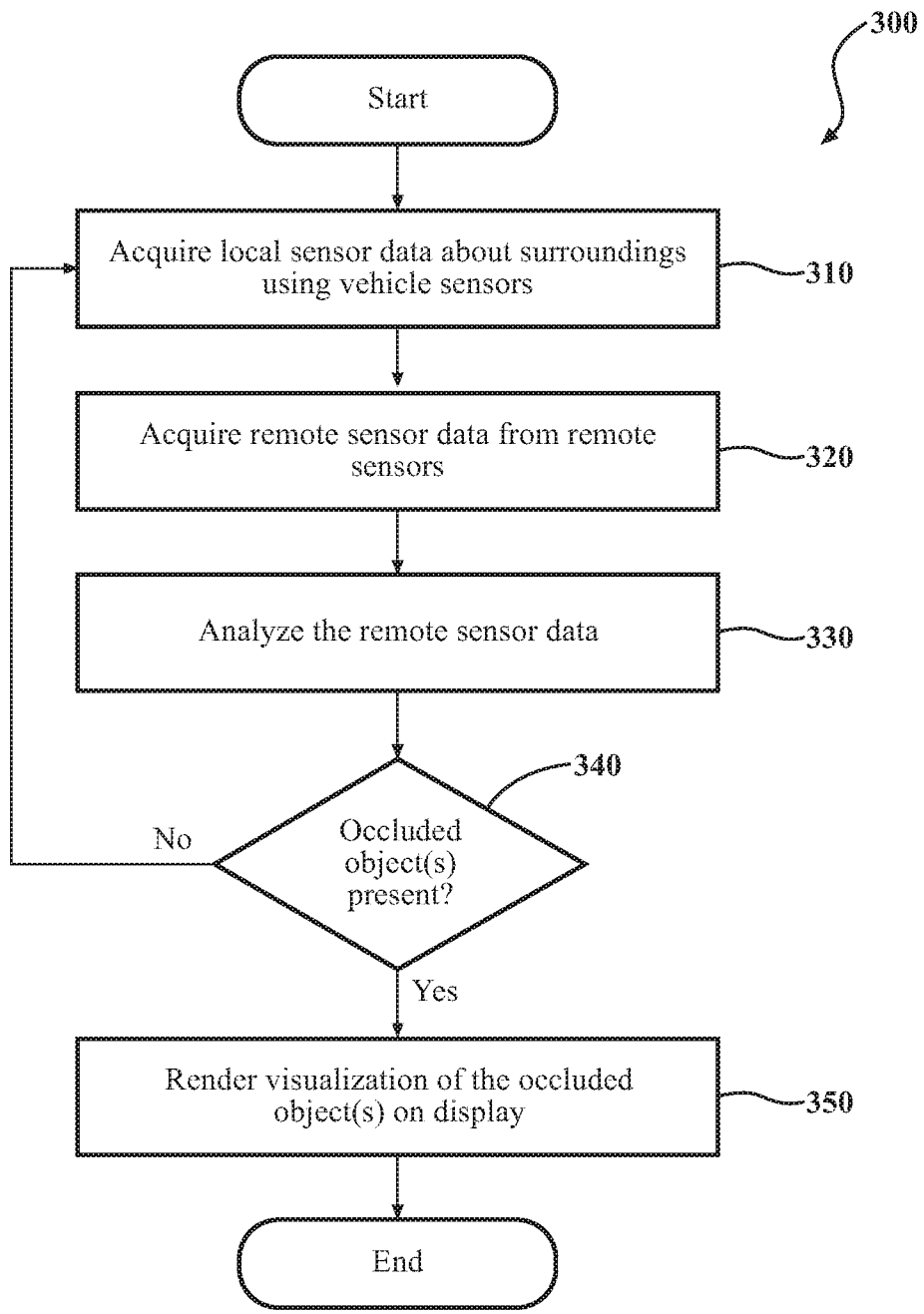
FIG. 3 is one example of a method that is associated with detecting occluded objects and displaying visualizations about the occluded objects.

Further aspects about the monitoring module 220 identifying the occluded objects from the remote sensor data 260 will be discussed in relation to FIG. 3. In either case, it should be appreciated that the monitoring module 220 generally acquires both the local sensor data 250 and the remote sensor data 260 in a continuous or at least a semi-continuous manner and similarly processes the sensor data 250/260 to provide an up-to-date mapping of objects within and aspects of the surrounding and nearby environments including identification of the occluded objects in the mapping.

Moreover, the display module 230, in one embodiment, uses the information of the mapping to render representations of the occluded objects to the driver and/or other occupants. That is, the display module 230 renders a graphic within a display of the vehicle 100 to convey to the driver and/or other occupants a location of an occluded object. The display may be an AR display, an in-dash display, or another human machine interface HMI that conveys the visualization to occupants of the vehicle 100. Additionally, the display module 230 renders the visualization in a manner so as to convey that the occluded object is obscured from view. Thus, the display module 230 can render the visualization as a silhouette, a dashed outline or another distinctive graphic representation of the occluded object in order to identify that the occluded object is in-fact obscured from view by the vehicle 100.

Additional aspects of detecting occluded objects will be discussed in relation to FIG. 3. FIG. 3 illustrates a flowchart of a method 300 that is associated with acquiring remote sensor data and using the remote sensor data to identify occluded objects. Method 300 will be discussed from the perspective of the vision system 170 of FIGS. 1 and 2. While method 300 is discussed in combination with the vision system 170, it should be understood that the method 300 is not limited to being implemented within the vision system 170, but is instead one example of a system that may implement the method 300.

At 310, the monitoring module 220 acquires the local sensor data 250. In one embodiment, the monitoring module 220 acquires the local sensor data 250 from the one or more vehicle sensors 120 and/or other data acquisition components (e.g., GPS of the navigation system) of the vehicle 100. As previously noted, the local sensor data 250 includes information about the surrounding environment of the vehicle 100. Thus, the monitoring module 220 can use the local sensor data 250 to detect and localize local objects and/or to provide a mapping (e.g., feature-based map) of the surrounding environment and relative locations of objects in the surrounding environment. Thus, the local sensor data 250 generally includes information perceived by the one or more vehicle sensors 120.

It should be appreciated that while the local sensor data 250 generally indicates features that are directly observed or perceived by the vehicle 100, the local sensor data 250 also indicates what is not known by the vehicle 100. That is, the vision system 170 can use the local sensor data 250 to determine regions within the surrounding environment where sensor data is unavailable or cannot be perceived because the regions are, for example, obscured by other objects, beyond a range or perception of the vehicle sensors 120, and so on. Thus, as will be discussed in further detail subsequently, the monitoring module 220 can use knowledge of known objects, terrain, etc. to determine whether remote objects from the remote sensor data 260 are within the unknown/obscured areas and are thus occluded.

At 320, the monitoring module 220 acquires the remote sensor data 260 from one or more remote sensors. As previously explained, the remote sensor data 260 indicates information about the nearby environment of the vehicle 100 including remote objects that may or may not be occluded, terrain, and so on. Moreover, the remote sensor data 260, in one embodiment, specifies at least a location of the particular remote objects but may also include object class information (e.g., vehicle, pedestrian, motorcycle, etc.), a trajectory, and so on. In general, the object class indicates a generic size and shape of the remote object but may also include specific information such as an image, point cloud data, color, etc.

As a further matter, the monitoring module 220 acquires the remote sensor data 260 through either an indirect query of the remote sensors or a direct query. The indirect query refers to communications provided between the vehicle 100 and a collection point for the remote sensor data 260 such as a centralized server, a local server for the particular locality that collects information from remote sensors in the particular vicinity, or another repository that generally aggregates and communicates the remote sensor data 260 on behalf of the remote sensors themselves. That is, for example, the remote sensors can provide a stream of the remote sensor data 260 to the particular repository and then the communication system 180 at the direction of the monitoring module 220 acquires the remote sensor data 260 from the repository.

In the case of direct acquisition, the monitoring module 220 uses the communication system 180 to directly transmit and receive communications with the remote sensors themselves. Accordingly, the remote sensors and/or the communication system 180 can participate in a discovery protocol by which the remote sensors and/or the communication system 180 transmit beacons announcing the presence of the particular device at regular intervals. Upon receiving and thereby discovering the presence of the respective remote sensor, communications can be established through queries requesting information that provide the remote sensor data 260. In further aspects, the discovery of the remote sensors and communication of the remote sensor data 260 may take on different formats depending on a particular implementation. However, the general approach is to wirelessly communicate with the remote sensors to acquire the remote sensor data 260 in order to gain information about aspects of the nearby environment, which are otherwise unknown to the vehicle 100.

Thus, in various implementations, the monitoring module 220 can control the communication system 180 to participate in a vehicle-to-vehicle (V2V) network, an ad-hoc network, a vehicle-to-infrastructure (V2I) network, a cellular communication network, or another suitable communication framework.

At 330, the monitoring module 220 analyzes the remote sensor data 260 to identify whether any occluded objects are present. In one embodiment, the monitoring module 220 uses the local sensor data 250 in combination with the remote sensor data 260 to identify whether one or more of the remote objects identified by the remote sensor data 260 are obscured and thus to be labeled as occluded objects. For example, in various embodiments, the monitoring module 220 and/or the autonomous driving module 160 generate and update a map of the surrounding environment. The map is generally a collection of perceived/observed obstacles (e.g., static aspects of the surrounding environment), observed objects (e.g., vehicles, etc.), and terrain features as identified from the local sensor data 250.

Accordingly, the monitoring module 220, in one embodiment, uses knowledge of the observed objects and other features, whether from the noted map or directly from the local sensor data 250 to determine areas that are obscured from perception by the vehicle sensors 120 and thus may include occluded objects. As a further matter, in order to determine the areas that are obscured, in one embodiment, the monitoring module 220 compares a location of the vehicle 100 with observed objects in the surrounding environment and may apply a ray-based analysis to determine whether a line-of-perception for the vehicle sensors 120 is obscured within various areas. In this way, the monitoring module 220 can trace scan lines, lines-of-sight, and so on in relation to sizes, shapes, and locations of observed features/obstacles/objects in the surrounding environment to determine where obscured areas are located.

Moreover, the monitoring module 220 can then determine a location of the remote objects as indicated by the remote sensor data 260. Thus, the monitoring module 220 identifies a remote object as being an occluded object when the remote objects correlate with the noted obscured regions. In further implementations, the monitoring module 220 also account for a shape and size of the remote object to determine whether the remote object is partially obscured or fully obscured. In either case, the monitoring module 220 can annotate the particular condition with the map or otherwise so that the vision system 170 can otherwise account for the occlusion. As a further note, while the remote objects are the general focus of determining a relationship with an obscured area from the perspective of the vehicle 100, in various embodiments, the monitoring module 220 may also account for objects identified by the local sensor data 250 that move into obscured regions area from their own movement or from movement of the vehicle 100 that shifts obscured areas in the surrounding environment.

At 340, the monitoring module 220 identifies the remote object as being an occluded object when the determination at 330 indicates the remote object is within an obscured area and is thus not perceived by the vehicle 100. The vision system 170 may then continue by displaying a visualization of the occluded object as will be discussed at 350. However, if the particular object is not obscured, then the vision system 170 continues by repeating the process for further remote objects. It should be appreciated that the vision system 170, in one embodiment, continuously updates the status of various objects in the surrounding and nearby environment in real-time such that the trajectories of the objects are tracked and regions that are obscured are updated. Thus, depending on a particular location of the vehicle 100 within the environment, movements of the vehicle 100, movements of the nearby objects, and so on the obscured areas shift and thus the monitoring module 220 updates assessments of whether objects are obscured or not and may adjust labeling of which objects are occluded in real-time.

At 350, the display module 230 renders a visualization of the occluded object within a display of the vehicle 100. In one embodiment, the display module 230 renders the visualization by generating a graphic that is representative of the occluded object. In various embodiments, the graphic can take different forms. For example, the graphic can be rendered as a silhouette of the occluded object, an outline of the occluded object, or another form that indicates the occluded object is obscured and not directly perceived at the present time by the vehicle 100.

Moreover, the display module 230 renders the visualization of the occluded object on one or more displays that can include a heads-up display, an AR display integrated with windows (e.g., windshield, side windows, etc.) of the vehicle 100, a center console display, or another suitable display. Accordingly, the display module 230 can render the visualization with different characteristics according to a type of display that is being controlled. For example, the display module 230 renders the graphic of the visualization as being at least partially transparent and, for example, in a 3D format when displayed on the AR display such that the graphic does not block a view of objects that are located in front of the occluded object. Moreover, the display module 230 may display the graphic in a 2D format on an overhead map that is rendered on an in-dash center console display. Thus, the graphic may be provided as a point feature within the map indicating placement without indicating a particular shape, as an overhead outline, or in another suitable form to convey location and that the object is occluded.

Moreover, when displayed within the map, the display module 230 may display the graphic of the occluded object with a general shape that correlates with a class of the occluded object. In further examples, the display module 230 can render the graphic with additional aspects such as a sonar pinging type of effect that includes concentric rings radiating from the graphic to provide further emphasis or alert relating to the presence of the occluded object. In either case, the display module 230 generally functions to provide a visual indicator of a location (i.e., particular locality) of the occluded object within the surrounding/nearby environment such that information regarding the occluded object is conveyed to the driver and/or other occupants to improve a situational awareness of the environment.

As an additional note, while the display module 230 is discussed as generally providing a view of the occluded object when the occluded object is otherwise obscured from being perceived by the vehicle sensors 100, in various aspects the display module 230 and/or the monitoring module 220 also provide the location and further information (e.g., trajectory) about the occluded objects to additional systems of the vehicle 100 such as the autonomous driving module 160 so that autonomous path planning, object avoidance, and other vehicle functions can be improved through heightened awareness of the present circumstances of the nearby and surrounding environment.

Figure 4:
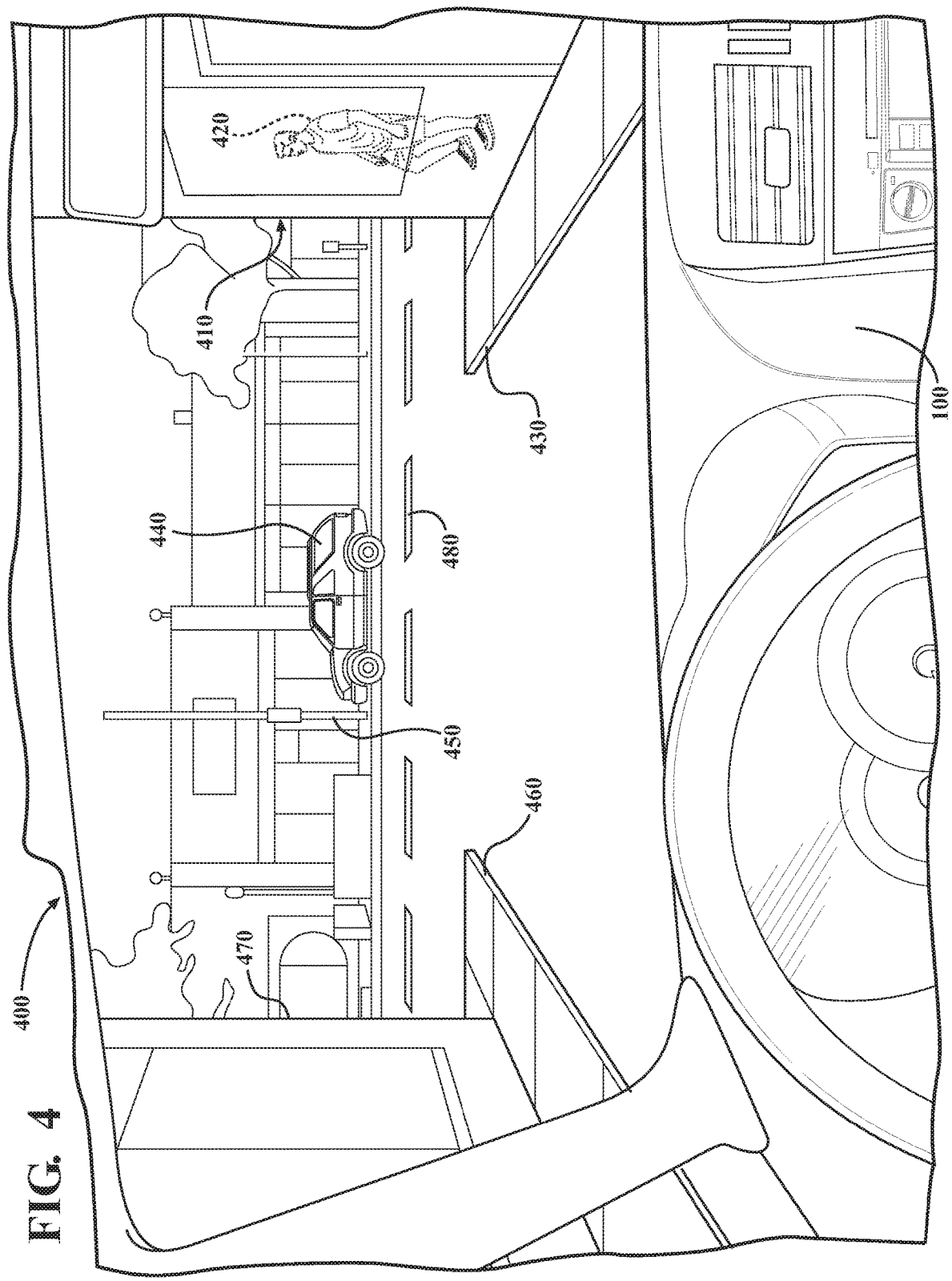
FIG. 4 is an example view from a vehicle that includes a visualization of an occluded object.
Figure 5:
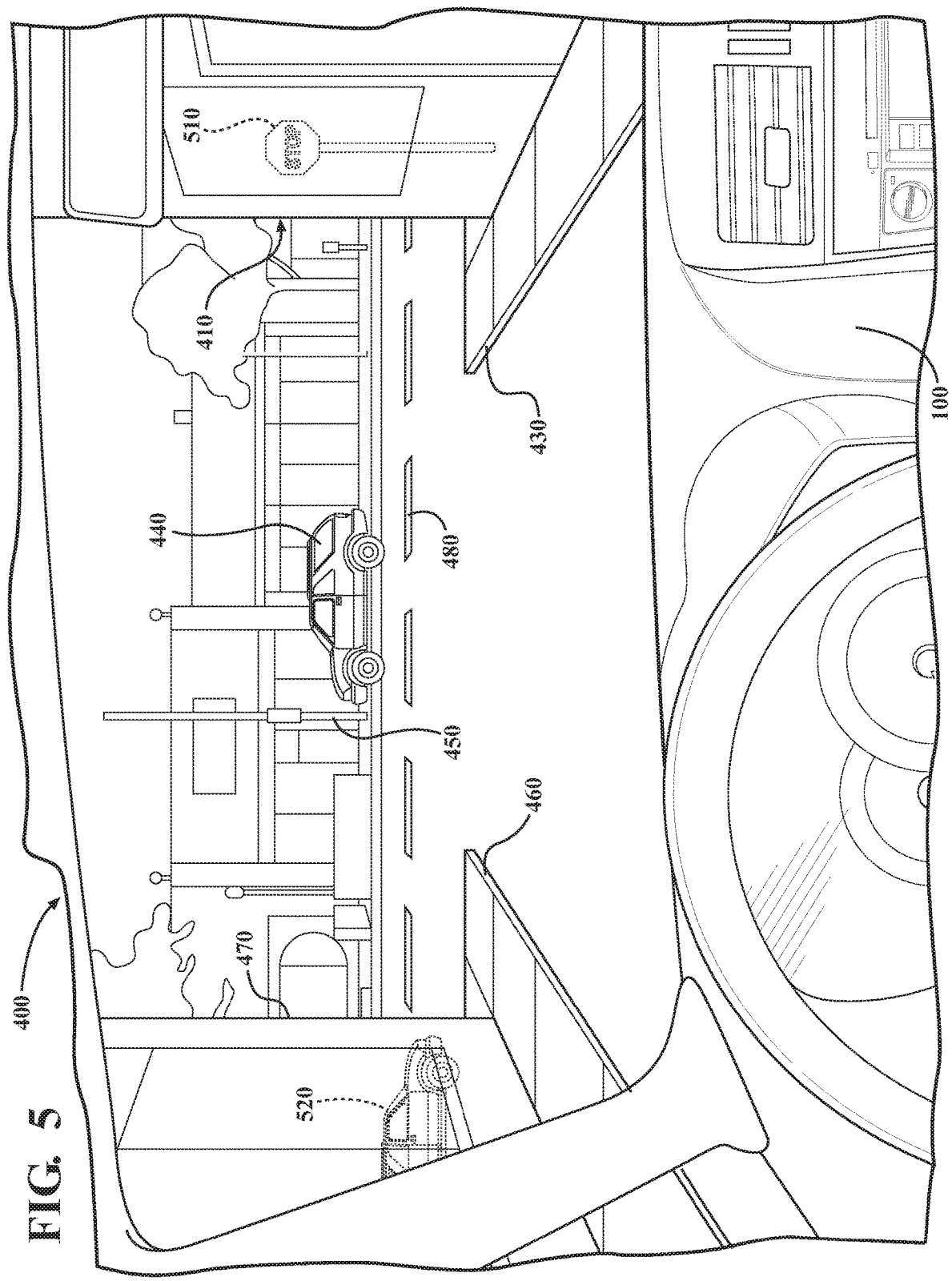
FIG. 5 is another example view from a vehicle through an augmented reality (AR) display that includes visualizations of occluded objects.
Figure 6:
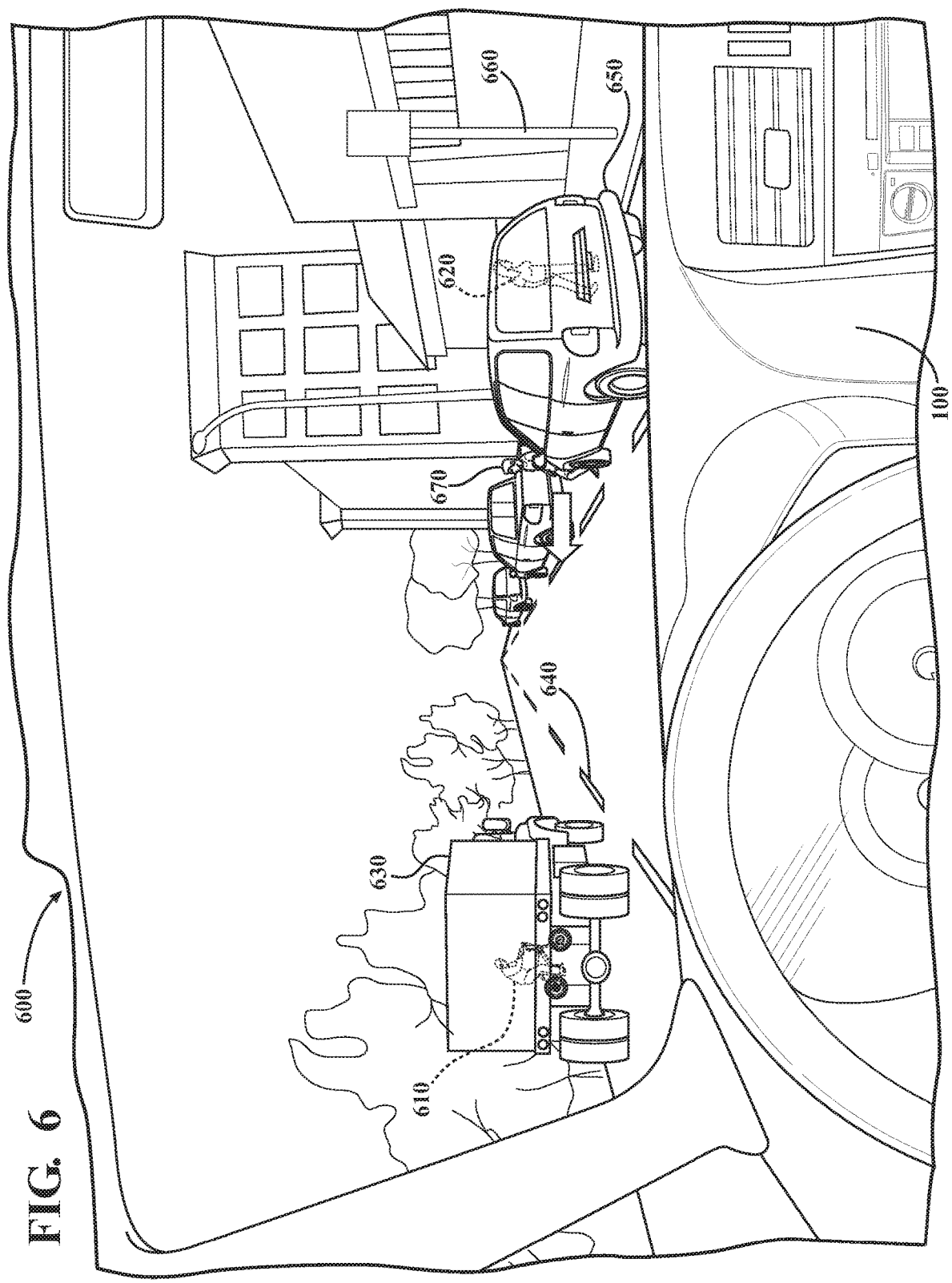
FIG. 6 is an additional example view from a vehicle that includes visualizations of occluded objects.

Further examples of how the display module 230 renders the visualizations will be provided in relation to the subsequent FIGS. 4-6. FIG. 4 illustrates one embodiment of a view 400 from within the vehicle 100 through a windshield of the vehicle 100. In the view 400, the windshield includes an integrated AR display that functions to display graphics in a manner so as to appear to be part of the surrounding environment. As shown within the view 400, a building 410 obscures an object 420, which is a pedestrian. As previously explained, the information about the pedestrian 420 is acquired by the monitoring module 220 from one or more remote sensors.

Thus, in the provided example view 400, the monitoring module 220 has acquired the remote sensor data 260 indicating that the object 420 is located in the shown location. The monitoring module 220 further analyzed the remote sensor data 260 in relation to a perspective of the vehicle 100 and the presence of known objects/features as determined from the local sensor data 250. From this analysis, the monitoring module 220 determined that the pedestrian 420 was obscured by the building 410. Consequently, the display module 230 renders the illustrated graphic for the object 420 as an outline of a pedestrian at the location indicated by the remote sensor data 260 and, in one embodiment, with movement associated with a trajectory provided by the remote sensor data 260.

Thus, it should be appreciated, that the vehicle sensors 120 acquire the local sensor information about the building 410, a right curb/sidewalk 430, a parked vehicle 440, a pole 450, a left curb/sidewalk 460, a second building 470, a lane marker 480, and other aspects of the surrounding environment to generate a map (e.g., feature-based map) and to perform additional tasks for the vehicle 100. However, the information about the pedestrian 420 is acquired through communications with another vehicle (e.g., vehicle 440) or other device that directly perceives the pedestrian 420. In either case, the monitoring module 220 processes the combination of the local sensor data 250 and the remote sensor data 260 in order to determine that the pedestrian is obscured from being perceived by the vehicle 100 and is thus an occluded object for which a visualization is provided as shown in the view 400.

FIG. 5 illustrates an additional view 500 of a scene that is similar to the view 400 of FIG. 4. However, in the view 500, the monitoring module 220 has detected occluded objects 510 and 520. The occluded object 510 is a stop sign, which is a static object, whereas the occluded object 520 is a vehicle. Accordingly, the monitoring module 220 acquired the remote sensor data 260 from the occluded object 520 itself or another remote sensor and proceeded to render the shown visualizations.

FIG. 6 illustrates a view 600 that includes two separate visualizations of occluded objects rendered by the display module 230 in response to detection of the occluded objects by the monitoring module 220. The view 600 includes occluded objects 610 and 620. The occluded object 610 is a person riding a bicycle while the occluded object 620 is a pedestrian. The view 600 includes aspects of the surrounding environment perceived by the vehicle sensors 120 such as truck 630, lane markers 640, vehicle 650, sign 660, pedestrian 670, and so on. Accordingly, the monitoring module 220 acquires the remote sensor data 260 which includes information about the objects 610 and 620. From the remote sensor data 260, the monitoring module 220 can identify that the object 610 is obscured from view by the truck 630. Additionally, the monitoring module 220 determines that the pedestrian 620 is obscured by the vehicle 650.

As a result of the monitoring module 220 identifying the occluded objects 610 and 620, the display module 230 renders the illustrated visualizations of the view 600. In this way, the vision system 170 improves awareness of the driver/occupants while, in one embodiment, also providing information to further systems of the vehicle 100 to improve path planning and other functions through heightened knowledge of the environment.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., a human operator). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., operator) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. an operator or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the vision system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the vision system 170, and/or the autonomous driving module(s) 160 may control some or all of these vehicle systems 140 and, thus, may be partially or fully autonomous.

The processor(s) 110, the vision system 170, and/or the autonomous driving module(s) 160 can be operatively connected to communicate with the various vehicle systems 140 and/or individual components thereof. For example, returning to FIG. 1, the processor(s) 110, the vision system 170, and/or the autonomous driving module(s) 160 can be in communication to send and/or receive information from the various vehicle systems 140 to control the movement, speed, maneuvering, heading, direction, etc. of the vehicle 100. The processor(s) 110, the vision system 170, and/or the autonomous driving module(s) 160 may control some or all of these vehicle systems 140.

The processor(s) 110, the vision system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the vision system 170, and/or the autonomous driving module(s) 160 can control the direction and/or speed of the vehicle 100. The processor(s) 110, the vision system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). In one embodiment, the vision system 170 can collect data about control signals from the processor 110 and the autonomous driving module 160 that cause the vehicle to accelerate, decelerate, and perform other various maneuvers and/or why the autonomous driving module 160 induced the maneuvers. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the vision system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vision system for depicting occluded objects on a display within a vehicle, comprising:
    one or more processors;
    a memory communicably coupled to the one or more processors and storing:
    a monitoring module including instructions that when executed by the one or more processors cause the one or more processors to acquire, within the vehicle from one or more remote sensors, remote sensor data that indicates information about a nearby environment of the vehicle,
    wherein the monitoring module includes instructions to identify an occluded object in the nearby environment according to the remote sensor data, and local sensor data generated by the vehicle, wherein the occluded object is obscured from being perceived by one or more vehicle sensors of the vehicle, wherein the local sensor data indicates information about at least observed objects in a surrounding environment that have been observed by the one or more vehicle sensors, and
    wherein the monitoring module includes instructions to identify the occluded object including instructions to analyze the remote sensor data in combination with the local sensor data to determine obscured areas in the nearby environment from a perspective of the vehicle in relation to the observed objects that obscure the perspective of the vehicle, and determine whether a remote object identified by the remote sensor data is within one of the obscured areas according to a ray-based analysis that traces lines-of-perception of the one or more vehicle sensors in relation to the observed objects and the remote object to identify whether a location of the remote object correlates with one of the obscured areas; and
    a display module including instructions that when executed by the one or more processors cause the one or more processors to render, within the display, a visualization of the occluded object to provide a view of the occluded object when the occluded object is otherwise obscured from being perceived by the vehicle.

2. The vision system of claim 1, wherein the display module includes instructions to render the visualization including instructions to generate the visualization as a graphic that depicts the occluded object on the display with an associated locality in the surrounding environment as identified from the remote sensor data, and wherein the graphic is an outline of the occluded object that represents that the occluded object is not being perceived directly by the vehicle and occupants of the vehicle.

3. The vision system of claim 1, wherein the remote sensor data indicates a class of a remote object that identifies a general shape and size, and includes a current location and trajectory of the remote object, and
    wherein the monitoring module includes instructions to determine that the remote object is within one of the obscured areas including instructions to determine whether the remote object is partially obscured or fully obscured according to at least the perspective of the vehicle that includes a line-of-sight of one or more of the vehicle sensors.

4. The vision system of claim 1, wherein the monitoring module further includes instructions to acquire the local sensor data from the one or more vehicle sensors about the surrounding environment to provide for a mapping of the surrounding environment and relative locations of observed objects in the surrounding environment.

5. The vision system of claim 4, wherein the monitoring module includes instructions to acquire the remote sensor data including instructions to query, over a communication network, the one or more remote sensors to induce the one or more remote sensors to transmit the remote sensor data to the vehicle,
    wherein the communication network is one of: a vehicle-to-vehicle (V2V) network, an ad-hoc network, a vehicle-to-infrastructure (V2I) network, and a cellular communication network, and
    wherein the monitoring module includes instructions to acquire the remote sensor data including instructions to query remote sensors in the nearby environment by transmitting wireless beacons at regular intervals to directly and indirectly query the remote sensors for the remote sensor data.

6. The vision system of claim 1, wherein the nearby environment encompasses a wider area about the vehicle than the surrounding environment, wherein the remote sensor data includes information that is beyond perception by one or more vehicle sensors of the vehicle, and
    wherein the display is an augmented reality display integrated within at least a windshield of the vehicle.

7. The vision system of claim 1, wherein the monitoring module further includes instructions to upload the local sensor data in response to a request from a remote vehicle for information about the surrounding environment.

8. A non-transitory computer-readable medium for improving awareness of occluded objects within a vehicle and including instructions that when executed by one or more processors cause the one or more processors to:
    acquire, within the vehicle from one or more remote sensors, remote sensor data that indicates information about a nearby environment of the vehicle,
    identify an occluded object in the nearby environment according to the remote sensor data, and local sensor data generated by the vehicle, wherein the occluded object is obscured from being perceived by one or more vehicle sensors of the vehicle, wherein the local sensor data indicates information about at least observed objects in a surrounding environment that have been observed by the one or more vehicle sensors, and
    wherein the instructions to identify the occluded object include instructions to analyze the remote sensor data in combination with the local sensor data to determine obscured areas in the nearby environment from a perspective of the vehicle in relation to the observed objects that obscure the perspective of the vehicle, and determine whether a remote object identified by the remote sensor data is within one of the obscured areas according to a ray-based analysis that traces lines-of-perception of the one or more vehicle sensors in relation to the observed objects and the remote object to identify whether a location of the remote object correlates with one of the obscured areas; and
    render, within a display of the vehicle, a visualization of the occluded object to provide a view of the occluded object when the occluded object is otherwise obscured from being perceived by the vehicle.

9. The non-transitory computer-readable medium of claim 8, wherein the instructions to render the visualization include instructions to generate the visualization as a graphic that depicts the occluded object on the display with an associated locality in the surrounding environment as identified from the remote sensor data, and wherein the graphic is an outline of the occluded object that represents that the occluded object is not being perceived directly by the vehicle and occupants of the vehicle.

10. The non-transitory computer-readable medium of claim 8, wherein the instructions further include instructions to acquire the local sensor data from the one or more vehicle sensors about the surrounding environment to provide for a mapping of the surrounding environment and relative locations of observed objects in the surrounding environment, and
wherein the instructions to determine that the remote object is within one of the obscured areas includes instructions to determine whether the remote object is partially obscured or fully obscured according to at least the perspective of the vehicle that includes a line-of-sight of one or more of the vehicle sensors.

11. The non-transitory computer-readable medium of claim 8, wherein the instructions to acquire the remote sensor data include instructions to query, over a communication network, the one or more remote sensors to induce the one or more remote sensors to transmit the remote sensor data to the vehicle, wherein the remote sensor data indicates a class of a remote object that identifies a general shape and size, and includes a current location and trajectory of the remote object,
wherein the communication network is one of: a vehicle-to-vehicle (V2V) network, an ad-hoc network, a vehicle-to-infrastructure (V2I) network, and a cellular communication network, and
wherein the instructions to acquire the remote sensor data include instructions to query remote sensors in the nearby environment by transmitting wireless beacons at regular intervals to directly and indirectly query the remote sensors for the remote sensor data.

12. A method of depicting occluded objects on a display within a vehicle, comprising:
acquiring, within the vehicle from one or more remote sensors, remote sensor data that indicates information about a nearby environment of the vehicle;
identifying an occluded object in the nearby environment according to the remote sensor data, and local sensor data generated by the vehicle, wherein the occluded object is obscured from being perceived by one or more vehicle sensors of the vehicle, wherein the local sensor data indicates information about at least observed objects in a surrounding environment that have been observed by the one or more vehicle sensors, and
wherein identifying the occluded object includes analyzing the remote sensor data in combination with the local sensor data to determine obscured areas in the nearby environment from a perspective of the vehicle in relation to the observed objects that obscure the perspective of the vehicle, and determining whether a remote object identified by the remote sensor data is within one of the obscured areas according to a ray-based analysis that traces lines-of-perception of the one or more vehicle sensors in relation to the observed objects and the remote object to identify whether a location of the remote object correlates with one of the obscured areas; and
rendering, within the display, a visualization of the occluded object to provide a view of the occluded object when the occluded object is otherwise obscured from being perceived by the vehicle.

13. The method of claim 12, wherein rendering the visualization includes generating the visualization as a graphic that depicts the occluded object on the display with an associated locality in the surrounding environment as identified from the remote sensor data, and
wherein the graphic is an outline of the occluded object that represents that the occluded object is not being perceived directly by the vehicle and occupants of the vehicle.

14. The method of claim 12, wherein the remote sensor data indicates a class of a remote object that identifies a general shape and size, and includes a current location and trajectory of the remote object, and
wherein determining that the remote object is within one of the obscured areas includes determining whether the remote object is partially obscured or fully obscured according to at least the perspective of the vehicle that includes a line-of-sight of one or more of the vehicle sensors.

15. The method of claim 12, further comprising:
acquiring the local sensor data from the one or more vehicle sensors about the surrounding environment to provide for a mapping of the surrounding environment and relative locations of observed objects in the surrounding environment,
wherein acquiring the remote sensor data includes querying over a communication network the one or more remote sensors to induce the one or more remote sensors to transmit the remote sensor data to the vehicle, wherein the communication network is one of: a vehicle-to-vehicle (V2V) network, an ad-hoc network, a vehicle-to-infrastructure (V2I) network, and a cellular communication network, and
wherein acquiring the remote sensor data includes querying remote sensors in the nearby environment by transmitting wireless beacons at regular intervals to directly and indirectly query the remote sensors for the remote sensor data.

16. The method of claim 15, wherein acquiring the local sensor data includes querying at least one of: nearby vehicles, a central server, mobile devices, and infrastructure sensors.

17. The method of claim 12, wherein the nearby environment encompasses a wider area about the vehicle than the surrounding environment, wherein the remote sensor data includes information that is beyond perception by one or more vehicle sensors of the vehicle, and wherein the display is an augmented reality display integrated within at least a windshield of the vehicle.

* * * * *